Patented Feb. 26, 1952

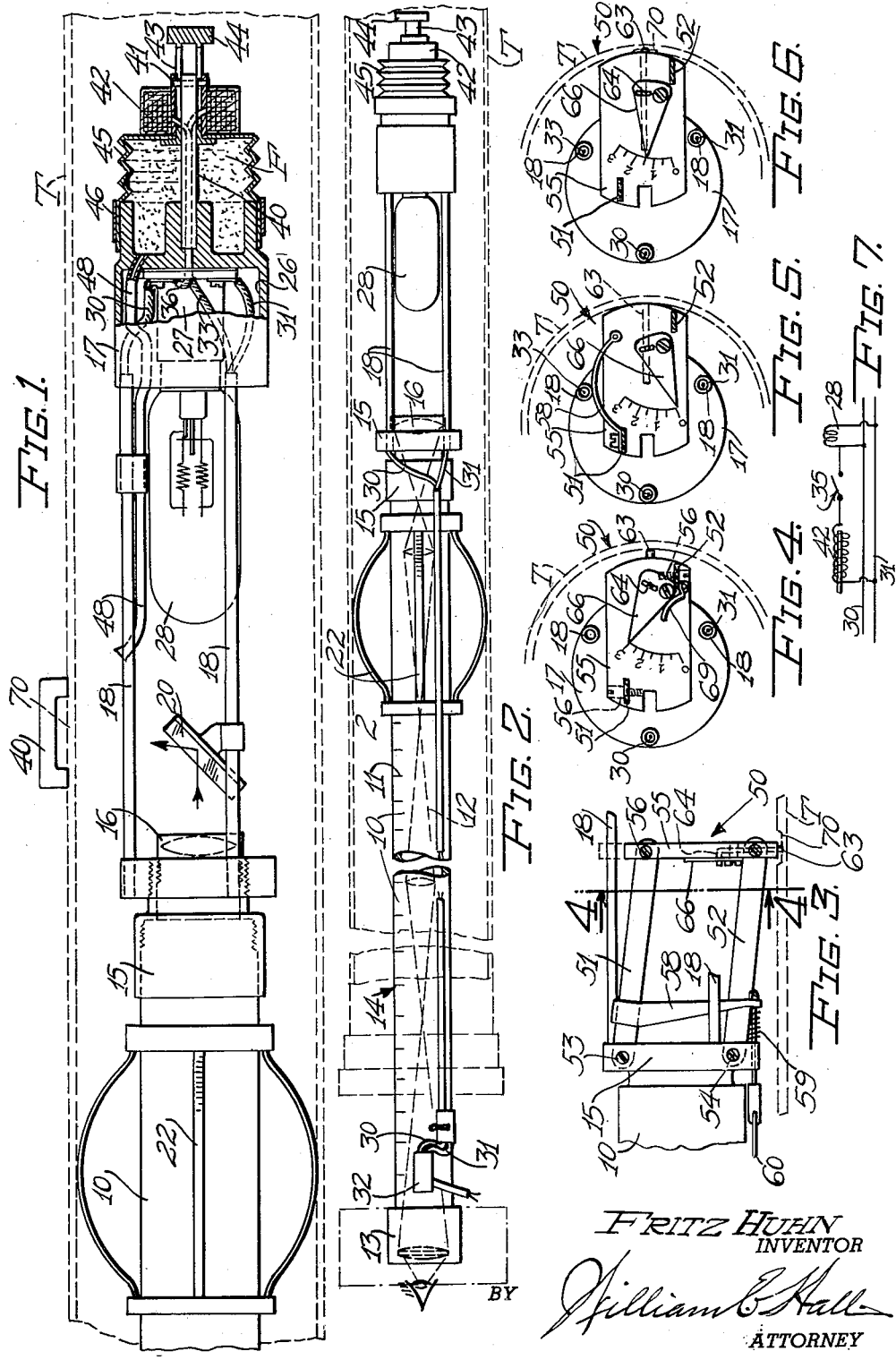

2,587,476

UNITED STATES PATENT OFFICE 2,587,476

APPARATUS FOR INTERNAL MAGNETIC AND MECHANICAL INSPECTION OF PIPES AND THE LIKE

Fritz Huhn, Ventura, Calif.

Application August 23, 1949, Serial No. 111,892

3 Claims. (Cl. 175—183)

This invention relates to an apparatus for and method of internal magnetic and mechanical inspection of pipe, and the like.

As is well known, flaws of various descriptions, such as cracks, crevices, seams, depressions, and other discontinuities, often occur in drill pipe, and other tubing, due to faulty manufacturing methods, wear, careless handling, corrosion, stresses of various kinds, and other causes.

Such defects may not be apparent on the outside of the pipe since they may sometimes be present only at the inside of the pipe. It is imperative that only drill pipe free from such flaws or defects be employed in well-drilling operations. Various flaw-detecting means and methods have been devised for the purpose, and while such flaw-detecting means and methods may be efficient in performing their intended function, they are by no means designed for nor effective in determining the nature and extent of the principal of more serious flaws.

It is an important object of the present invention to provide a flaw-detecting means which is highly efficient in facilitating inspection of the interior of tubing, and particularly of drill pipe, and one which, in proportion to its functions, is particularly simple in construction and economical to manufacture and one which is relatively simple to apply and operate.

Another object is to provide a detecting means of the character referred to which is adapted for insertion into a pipe to be inspected, and which includes means for illuminating the interior of the pipe, optical means for permitting visual inspection of the interior of the pipe so lighted, means for determining the nature of the flaw, and photographic means for recording the flaw for future reference.

Another object is to provide a detecting device of the type indicated in which the optical means comprises a mirror which may be directed toward all portions of the illuminated interior of the pipe, and a telescope through which the images on the mirror can be viewed by the workman inspecting the pipe.

Another object is to provide a device of the type specified in which the means for determining the nature of a flaw includes a magnet which can be placed against the exterior of the pipe in the area of the suspected flaw to create a magnetic field, and manually controlled means for directing iron filings toward the flaw to cause them to adhere to the wall of the pipe due to the magnetic flux, the pattern assumed by the filings indicating to the observer the nature of the flaw.

A further object is to provide a device, of the character referred to, having a pit gage for measuring the depth of pits or depressions on the inside wall of the pipe and in which the measuring means or gage consists of a manually controlled instrumentality movable toward the flaw and having a pin, or the like, adapted to enter the flaw, the extent of movement of the pin into the flaw determining the depth thereof and being indicated on a dial which is viewable through the telescope.

Another object is to provide a method of inspecting the interior of a pipe, this method consisting in the steps of illuminating the interior of the pipe, visually observing the interior of the pipe to detect a flaw therein, applying iron filings to the area of the flaw to outline the flaw, observing the outline to determine the nature of the flaw, photographing the pattern, removing the iron filings, and determining the depth of the flaw.

Further objects of the invention are set forth in the following specification which describes one embodiment of the invention, by way of example, as illustrated by the accompanying drawing. In the drawing:

Fig. 1 is a side view of my improved flaw-detecting device in a preferred form;

Fig. 2 is an enlarged, part-sectional, fragmentary view of the inner end of the device;

Fig. 3 is a fragmentary view of the device having a depth-measuring means in operative position in place of the mirror;

Fig. 4 is a cross-sectional view, taken on line 4—4 of Fig. 3, and illustrating the relation of the parts of the measuring means at the start of a measuring operation;

Fig. 5 is a view similar to Fig. 4, showing the parts at the completion of a measuring operation when the depth of an apparent fault is immeasurable;

Fig. 6 is a similar view illustrating the manner in which the measuring means indicates the depth of a measurable fault; and, Fig. 7 is a diagram of the electrical circuit for the illuminating and coating applying means.

Referring to the drawing in detail, my improved flaw-detecting device includes a tube 10, which is equal in length to approximately that of the pipe or tubing T which is to be inspected, the tube 10 being preferably made in sections which are screw-threaded in coaxial relation. The outside of the tube 10 may be provided with a scale 11 to indicate the extent to which it is inserted into the pipe. Within the tube 10 is a system of lenses, indicated at 12, the tube also including an eyepiece 13 at its outer end. The lenses and eyepiece provide a telescope 14 by which the interior of the pipe can be viewed in the manner to be later explained.

To the inner end of the tube 10 is attached an outer annular holder 15 into which can be screwed a lens element 16, or other lens elements. An inner cap element 17 is supported by the holder 15 in spaced relation thereto by means of small tubes 18. The spaces between the tubes 18 together provide an opening through which the interior of the pipe T can be viewed by means of the telescope 14. In order to concentrate the view on a particular area of the pipe T, that is, to observe selected areas of the pipe more closely, I prefer to employ a mirror 20 which is detachably connected to the tubes 18 by spring ears or clips 21 on the mirror (Fig. 2). To maintain the inner end of the device substantially coaxial with the pipe T being inspected, the device carries a pair of spring elements 22 which engage the interior of the pipe. In order to record photographically a flaw within the pipe T, I propose to employ a suitable camera, shown by dot-and-dash lines at the extreme left-hand end of Fig. 2, the camera being screwed directly on the outer end of the eyepiece 12 of the telescope tube 10.

The inner cap element 17 has a cupped end 26 in which a light socket 27 is held, the socket receiving an electric lamp 28, preferably of the projection type providing great light intensity. As will be apparent, when the lamp 28 is lighted it illuminates the interior of the pipe T being inspected. The lamp 28 is connected in an electric circuit which includes wires 30 and 31 (Fig. 7) which extend from a terminal 32 along the telescope tube 10, and thence through two of the connecting tubes 18 and into the end 26 of the cap element 17 where they are connected to the terminals of the lamp socket 27, as shown in Fig. 2. A third wire 33 leads from the terminal block 32 through the third tube 18 and through a bore of the cap element 17, as shown in Fig. 2, a switch 35 being connected in the wire 33. A fourth wire 36 leads from one terminal of the lamp socket 27 through the bore.

After a flaw has been detected in the pipe T through the telescope 14, in order to determine the extent and nature of the flaw my invention contemplates the step of applying iron filings to the inside wall of the pipe in the presence or approximate location of the flaw, to form a pattern which is then observed through the telescope. I prefer to employ iron filings for the purpose and to cause the filings to adhere to the interior of the pipe by magnetic attraction. To set up such a magnetic field in the wall of the pipe T a permanent magnet 40 is employed, the magnet being placed against the outer surface of the pipe, as shown in Fig. 2, in a manner such as to produce a magnetic field across the flaw. Thus, if the flaw is a crack, and iron filings are blown in the general direction of such a flaw, they will be attracted by the magnetic dipoles formed at the opposite sides of the crack in the pipe wall, and thereby indicate the presence and location of the crack. The iron filings are blown in the manner explained above by means to be next described.

Fast in the end of the cap element 17 is a brass rod 40, upon the projecting end of which is held, by a pin 41, an electro-magnet coil 42. Slidable on the rod 40 within the coil 42 is a brass armature tube or pole piece 43 having an iron head 44. Joined to the inner end of the armature tube 43 is one end of a bellows element 45, the other end of the bellows element surrounding the periphery of the cap element 17 and being fastened thereto by a ring 46. The wires 33 and 36 extend through a bore of the rod 40 and are connected to the leads of the electro-magnet coil 42, as shown in Fig. 2. When the switch 35 is closed, the electro-magnet coil 42 is energized and acts to draw the head 44 of the tube 43 toward it, thus causing contraction of the bellows element 45 to expel iron filings F from the bellows element through a small tube 48, which extends along one of the tubes 18 and is provided with a nozzle at its end through which the filings are blown toward the area of the flaw.

It will be noted that the tube 43 is longitudinally slotted at its diametrically opposite sides. The pin 41 extends through the slots to permit the tube to be moved longitudinally.

The depth of the flaw may be measured by means of a measuring device 50, shown in Figs. 3, 4, 5, and 6. The device 50 comprises a pair of arms 51 and 52 which are pivoted at one end on pins 53 and 54 within slots of a holder 15, similar to that described above. The arms pivotally mount between their other ends a transverse plate 55, by means of pivot pins 56 (Fig. 4). The holder 15, arms 51 and 52, and the plate 55 together form a parallelogram so that when the arms are pivoted the plate is moved in a plane normal to the axis of the flaw-detecting device, in other words, at right angles to the axis of the pipe T being inspected. The arms are pivoted manually by means of a finger 58 connected to one arm 51, the free end of the finger being operatively connected to one end of a spring-actuated plunger 59. The plunger 59 is slidable in the holder 15 and a cord 60 is connected to the plunger and extends along the telescope tube 10 to a point adjacent the outer end thereof. By pulling the cord 60, the finger 58 is pivoted in a direction to cause the plate 55 to move from the position, shown by dotted to the solid lines in Fig. 3, and also shown in Figs. 4 to 6, and when the cord is released the plate is restored to first position.

Slidable in a hole in the plate 55 is a measuring pin 63, the inner bent end 64 of which passes through a slot in the plate and engages in a slot 65 of a pointer 66 which is pivoted at 67 to the plate. The pointer is adapted to register with the graduations of a curved scale 68 inscribed on the plate 55. The graduations may designate small fractions of an inch. A spring 69 serves to normally pivot the pointer 66 in clockwise direction, as indicated in Fig. 4, so as to align it with the graduation representing the highest value and to project the end of the measuring pin 63 from the side of the plate 55. When it is desired to determine the depth of a flaw, such as the defect shown at 70, the cord 60 is pulled to cause the plate 55 to move toward the flaw. Eventually the curved side of the plate 55 engages against the inner surface of the pipe T, and the measuring pin 63 is forced into the plate, as shown in Fig. 5, so as to pivot the pointer 66 toward the zero mark of the scale 68. If, however, the flaw has some measurable depth, the end of the pin 63 enters the flaw and thus will not be fully depressed into the plate 55, but rather will be moved only an amount which will cause the pointer to indicate on the scale the amount which the pin projects from the plate into the flaw. For example, in Fig. 6 the pin 63 projects from the plate 55 a distance which, as shown by the pointer, is equal to one and one-half units of measurement; if each unit equals .020″ then the scale indicates that the flaw is .030″ deep. The reading of the scale is readily made by merely sighting the scale through the telescope 14, it being understood that during the measuring operation the mirror 20 is removed to permit such viewing of the scale.

The various steps performed in carrying out the over-all method of inspecting the interior of a pipe to detect and determine the nature and extent of the defect have already been outlined, and it remains only necessary to set forth the preferred sequence of these steps, which is preferably as next explained. To inspect the interior of a pipe T, the device is slid gradually into the pipe. During the insertion of the device in the pipe, the lamp 28 is activated so that the interior of the pipe is adequately illuminated.

The illuminated wall of the pipe is then viewed through the telescope 14. When an apparent flaw is sighted the location thereof is determined. The device may be withdrawn to receive the mirror 20 and thereafter reinserted into the pipe, and the flaw viewed in the mirror with more accuracy. A magnet 40 is then placed against the outer surface of the pipe T, as indicated in Fig. 2, and the switch 35 closed to energize the electro-magnet 42 so as to cause the bellows element 45 to expel iron filings through the tube 48 toward the area of the flaw. The pattern of the iron filings adhering to the pipe, due to the magnetic force, are then observed through the telescope 14. If it is desired to photographically record the pattern, the camera may be attached to the end of the telescopic tube 10, as indicated in Fig. 2, and the camera operated to record the image appearing in the mirror, it being understood that a special lens 16 may be employed.

Following the photographic step, if a photograph is made, or following the previous step, if no photograph is desired, the device with the measuring means is inserted. The measuring plate 55 is aligned with the flaw, after which the plate is moved toward the flaw and its pin 63 caused to enter the crack or other flaw, the extent to which the pin enters the flaw being indicated on the scale 68 by the pointer 66 which is observed through the telescope 14. This completes the procedure of detecting a flaw, determining the location, nature, and depth of the flaw and photographically recording the same, and if other flaws exist in the pipe they may be similarly detected and examined. Thus, my invention provides a simple, yet highly efficient method of and means for inspecting pipes, or other tubing, and like conduits.

While I have herein disclosed the method as comprising a particular series of steps performed in a specific sequence, and described the device as embodied in a preferred form of construction, it will be apparent that various modifications might be made therein without departing from the spirit of the invention.

I claim:

1. A device for facilitating detection of flaws within a pipe, comprising: an elongated tubular member adapted to be inserted in a pipe, said member having an opening adjacent its inner end; electric illuminating means carried by said member and adapted to project light through said opening to illuminate the interior of the pipe; optical means within said member, including an eyepiece at the outer end thereof, through which the illuminated interior of the pipe can be observed through said opening to detect flaws; a receptacle on said member for containing a coating material; and manually controlled, electrically energized means operative to force said material from said receptacle onto flaw areas of said pipe observed through said optical means, said receptacle consisting of an expansible-contractible flexible element defining with said member a chamber for containing the material, and said manually controlled means comprising an electro-magnet having a pole piece connected to said flexible element.

2. A device for facilitating detection of flaws within a pipe, comprising: an elongated tubular member adapted to be inserted in a pipe, said member having an opening adjacent its inner end; electric illuminating means carried by said member and adapted to project light through said opening to illuminate the interior of the pipe; optical means within said member, including an eyepiece at the outer end thereof, through which the illuminated interior of the pipe can be observed through said opening to detect flaws; a receptacle on said member for containing a coating material; and manually controlled, electrically energized means operative to force said material from said receptacle onto flaw areas of said pipe observed through said optical means, said receptacle consisting of a bellows, and said manually controlled means comprising an electro-magnet operatively connected to said bellows.

3. A device for facilitating detection of flaws within a pipe, comprising: an elongated tubular member adapted to be inserted in a pipe, said member having an opening adjacent its inner end; electric illuminating means carried by said member and adapted to project light through said opening to illuminate the interior of the pipe; optical means within said member, including an eyepiece at the outer end thereof, through which the illuminated interior of the pipe can be observed through said opening to detect flaws; a receptacle on said member for containing a coating material; and manually controlled, electrically energized means operative to force said material from said receptacle onto flaw areas of said pipe observed through said optical means, said receptacle consisting of a bellows, and said manually controlled means comprising an electro-magnet operatively connected to said bellows, said device also including a conduit connected to said bellows and adapted to direct said material from said bellows to flaw areas of the pipe.

FRITZ HUHN.

REFERENCES CITED

The following references are of record in the file of this patent:

UNITED STATES PATENTS

| Number | Name | Date |
|---|---|---|
| 1,591,258 | Ames | July 6, 1926 |
| 1,602,233 | Lyon | Oct. 5, 1926 |
| 1,947,729 | Morrison | Feb. 20, 1934 |
| 2,124,579 | Knerr et al. | July 26, 1938 |
| 2,158,409 | De Forest et al. | May 16, 1939 |
| 2,196,922 | Hybager | Apr. 5, 1940 |
| 2,245,792 | Kuhn | June 17, 1941 |
| 2,257,736 | Ferrier | Oct. 7, 1941 |
| 2,265,136 | Barnes et al. | Dec. 9, 1941 |
| 2,334,827 | Lyons | Nov. 23, 1943 |
| 2,363,701 | Soelbeer | Nov. 28, 1944 |
| 2,371,176 | Kirk et al. | Mar. 13, 1945 |
| 2,495,545 | Peterson et al. | Jan. 24, 1950 |

FOREIGN PATENTS

| Number | Country | Date |
|---|---|---|
| 463,361 | Great Britain | Mar. 30, 1937 |
| 547,714 | Great Britain | Sept. 8, 1942 |